(No Model.)

M. H. DOWNES.
CYCLOMETER.

No. 363,993. Patented May 31, 1887.

WITNESSES:
Chas. S. Gooding
E. A. Phelps

INVENTOR:
Moses H. Downes
by A. H. Spencer, atty

United States Patent Office.

MOSES H. DOWNES, OF MALDEN, ASSIGNOR TO THE OVERMAN WHEEL COMPANY, OF CHICOPEE, AND CHARLES E. W. WOODWARD, OF CAMBRIDGE, MASSACHUSETTS.

CYCLOMETER.

SPECIFICATION forming part of Letters Patent No. 363,993, dated May 31, 1887.

Application filed November 13, 1884. Serial No. 147,817. (No model.)

*To all whom it may concern:*

Be it known that I, MOSES H. DOWNES, a citizen of the United States, residing at Malden, in the county of Middlesex and State of Massachusetts, have invented certain new and useful Improvements in Cyclometers; and I do hereby declare that the same are fully described in the following specification and illustrated in the accompanying drawings.

The object of this invention is to provide for bicycles and other wheeled vehicles an improved instrument for measuring distances traveled by recording the number of revolutions of the main wheel. The instruments most commonly used for this purpose are suspended within the wheel and act by gravitation, but are open to many objections. My device is actuated positively, being furnished with a projecting arm or movable part which at each revolution of the wheel strikes the fork or frame or some other non-rotating part of the vehicle, and this contact serves to actuate the recording mechanism by means of a ratchet and train of gearing, or otherwise. The main dial is graduated to denote one hundred miles travel, and one or more small dials with revolving hands are provided within this circle, one indicating a mile and its fractions, while a second counts the number of hundreds and a third the number of thousands of miles.

Figure 1:
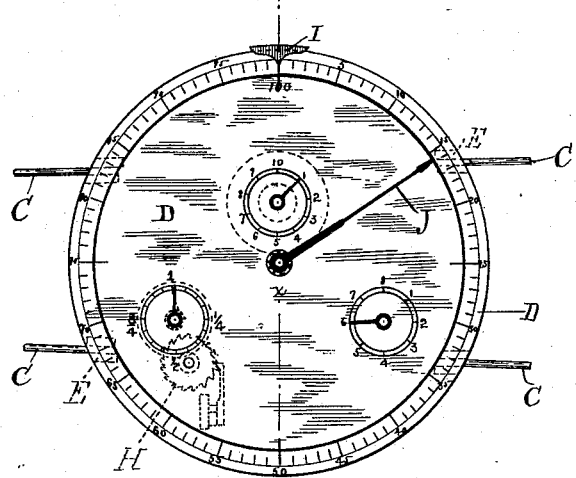
Figure 2:
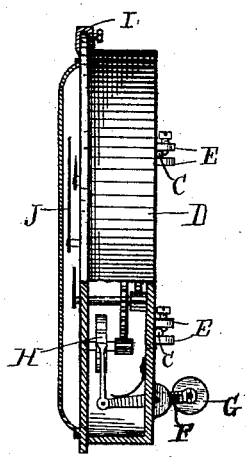
Figure 3:
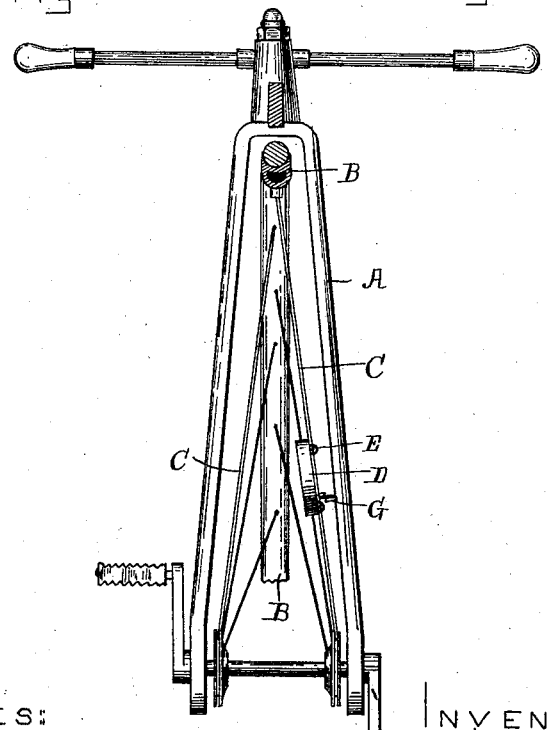

In the drawings, Figure 1 represents a front view of the instrument secured to the spokes of the wheel. Fig. 2 is a transverse section, showing the case and gearing and a projecting arm to actuate the mechanism by contact with the frame. Fig. 3 represents the upper portion of a bicycle with the instrument in position in the wheel.

A is the fork or frame of a bicycle, B the rim, and C the spokes of its wheel.

D is the cyclometer or recorder of distances, in this instance shown as placed within the wheel and secured to the spokes C by fingers E, or any suitable clamp or fastening. The instrument is provided with a projecting arm, F, preferably furnished with a small rubber-faced wheel, G, to come into noiseless contact with the frame or fork A at each revolution of the wheel, and by such contact to move the internal ratchet-wheel, H, on its axis to the extent of one tooth, thus proportionately actuating the entire train of gearing.

The various dials show by the position of the hands the distance passed over, as is usual with this class of instruments, the gearing being so arranged with relation to the circumference of the wheel that a given number of revolutions will measure a mile.

In order to show at a glance the number of miles traveled on any given day, I provide an adjustable indicator, I, which may be fixed in position to denote the starting-point for any particular trip, while the hand J, moving round on the dial, indicates how far from the starting-point the vehicle has run. Thus in Fig. 1 the indicator is at zero and the hand J shows a trip of sixteen miles. I make no present claim to this feature.

I claim as my invention—

1. A cyclometer having a pivoted arm adapted to actuate a train of distance-measuring mechanism, in combination with a roller at the free end of said arm for contact with a part of the vehicle at each revolution, substantially as and for the purpose set forth.

2. The combination, with the spokes of a traveling-wheel, of a cyclometer positively actuated by the successive contacts of a vibrating arm on the cyclometer and a fixed part of the frame, substantially as set forth.

In testimony whereof I hereto affix my signature in presence of two witnesses.

MOSES H. DOWNES.

Witnesses:
  A. H. SPENCER,
  THOMAS F. BELL.